DIRECT CURRENT VOLTAGE RESTORATION CIRCUIT

Filed Sept. 10, 1953

INVENTOR
H. A. SCHNEIDER
BY
[signature]
ATTORNEY 2,760,090
Patented Aug. 21, 1956

2,760,090

DIRECT CURRENT VOLTAGE RESTORATION CIRCUIT

Herbert A. Schneider, Coytesville, N. J., assignor to Bell Telephone Laboratories, Incorporated, New York, N. Y., a corporation of New York Application September 10, 1953, Serial No. 379,453

8 Claims. (Cl. 307—106)

Figure 1:
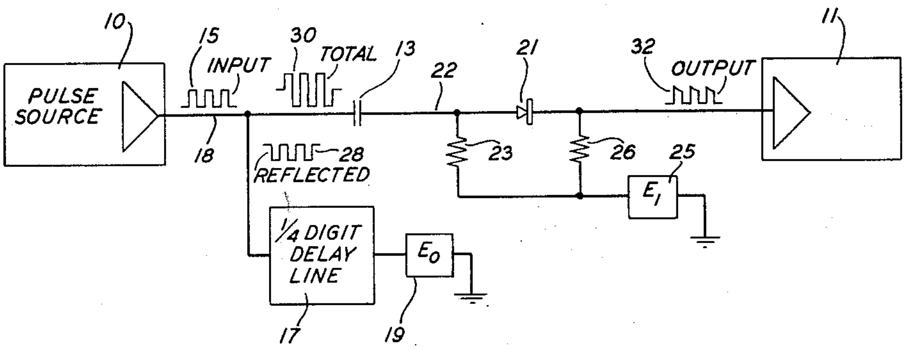

This invention relates to electrical circuits in which information is transmitted between components of the circuit in the form of pulse trains and more particularly to such circuits wherein the components are maintained at different direct current potentials.

It is generally known that alternating current coupling is essential between various circuit components and particularly between amplifiers in an electrical circuit if the input of the second amplifier operates at a different direct current voltage level from the output of the prior amplifier. Similarly, in some circuits information may be transmitted in the form of pulse trains between two logic circuits which are maintained at different direct current voltage levels. This alternating current coupling is frequently obtained by interposing a coupling capacitor in the conducting path between the two circuit elements. Difficulty, however, is encountered due to the charging of this coupling condenser as the pulse train is transmitted through it, as this charging causes the direct current level or base of the pulses to shift. The base voltage, which determines the amplitude of the pulse, will thus tend to vary from the voltage base of the component to which the pulse is being applied due to this charging of the coupling condenser, and will vary with number of adjacent pulses in the pulse train.

It has been known that direct current restoration or clamping of the direct current voltage level is desirable to maintain the proper base voltage and therefore proper pulse amplitude. Priorly this restoration or clamping has been attained through vacuum tube clamping circuits of various types and complexities.

It is a general object of this invention to provide an improved circuit for maintaining the desired direct current voltage level of pulses being transmitted through a coupling condenser between two circuit elements in an electrical circuit.

More specifically objects of this invention include simplifying clamping or restoration circuits and providing circuits which require small volume, have a high degree of reliability, are insensitive to time and temperature variations, and are inexpensive.

In many electrical systems, the interval between the start of successive pulses in an information pulse train, which interval is constant and is referred to as a digit or a digit time, is equally divided between the pulse and the period between the pulses. In accordance with one aspect of this invention each pulse generates a corresponding pulse of the opposite polarity which occurs in this half digit interval between pulses and which is approximately of the same power. These positive and negative pulses are then jointly applied to the coupling condenser and a detector circuit provided at the output of the coupling condenser to remove the added pulse portions of opposite polarity. This pulse generation is attained in accordance with this invention by connecting a quarter digit delay line which is substantially terminated in a short circuit to the conducting path between the source of pulses and coupling condenser. A pulse from the pulse source is therefore simultaneously applied both to the coupling condenser and the input of this quarter digit delay line. As a short circuited delay line reflects back a pulse of the opposite polarity, this initial pulse will be reflected back to the input one-half digit later. If the original pulse was positive, a negative pulse is therefore applied to the coupling condenser in this one-half digit interval between successive positive pulses. By making the characteristic impedance of the delay line substantially equal or slightly less than the impedance seen by the pulse at the coupling capacitor, the power in the negative and positive pulses, that is, the power in the initial pulse and in the reflected pulse, can be made approximately equal and direct current voltage level restoration or clamping attained.

It is a feature of this invention that a one-quarter digit delay line substantially terminated in a short circuit be connected to the conducting path between a source of pulses of one-half digit length, which pulses constantly recur at one-digit intervals, and a coupling condenser to attain restoration of the direct current voltage level of the train of pulses.

It is a further feature of this invention that the characteristic impedance of the delay line be substantially equal or slightly less than the impedance seen by the train of pulses at the coupling condenser so that the positive and negative pulses applied to the condenser are of approximately equal power.

Figure 2:
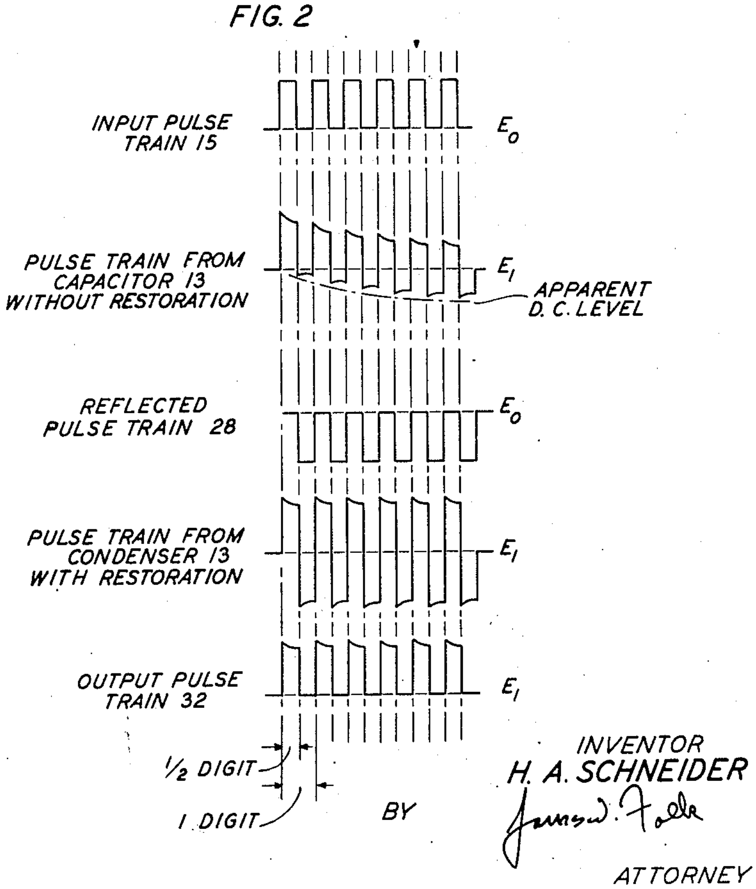

These and various other features of this invention may be understood more fully from consideration of the following detailed description and the accompanying drawing, in which:

Fig. 1 is a schematic representation of one specific illustrative embodiment of this invention; and Fig. 2 is a plot of the pulse trains at various points in the circuit of Fig. 1, both in accordance with this invention and without direct current voltage level restoration.

Turning now to the drawing, the problem faced by the art is to couple a pulse source 10 which we may consider to be maintained at a direct current voltage level $E_0$ to another circuit element 11 which we may consider to be maintained at a separate voltage level $E_1$. Each of these circuit elements 10 and 11 may comprise amplifiers, logic circuits or other components which may be employed in electrical systems. Because the two elements are maintained at the different direct current voltage levels $E_0$ and $E_1$, they must be alternating current coupled as by a coupling capacitor 13. A train of pulses 15 is therefore transmitted from the pulse source 10 through the coupling capacitor 13 to a circuit element 11. Turning now to Fig. 2, the input pulse train 15 is there depicted in a time plot, as is the pulse train from the coupling capacitor 13 in the absence of any direct current level restoration or clamping. As can be seen, the input pulse train 15 comprises a series of pulses of constant amplitude as determined from the base voltage $E_0$. The pulse train from the capacitor 13, in the absence of restoration or clamping, however, contains pulses of amplitude decreasing from the initial pulse until the pulses have equal positive and negative portions on both sides of the base voltage $E_1$. Actually this decrease in amplitude occurs so rapidly that it is difficult if not impossible to observe on an oscilloscope, the lack of clamping however being clearly indicated by the decrease in the amplitude of the pulses on the output side of the coupling capacitor 13 to about half their amplitude on the input side of the coupling capacitor. The base level of the pulse train from the coupling capacitor is therefore not the voltage $E_1$ but is an apparent direct current voltage level below that voltage as indicated in Fig. 2.

In accordance with my invention a one-quarter digit delay line 17, which may be either of the lumped or distributed type, has its input connected to the conducting path 18 between the pulse source and the coupling capacitor 13. A source 19 of a voltage $E_0$ may be connected between the delay line and ground and is a low impedance source so that the delay line 17 is substantially terminated in a short circuit. A unidirectional current element or diode 21 is advantageously connected in the conducting path 22 between the coupling capacitor 13 and circuit element 11. A resistance 23 is connected between one side of the diode 21 and a source 25 of a voltage $E_1$ and a resistance 26 is connected between the other side of diode 21 and source 25, the source 25 being connected to ground.

At the instant the first pulse of the input train 15 is applied to the coupling capacitor 13 it is also applied to the one-quarter digid delay line 17. As this delay line is terminated substantially in a short circuit the pulse, after a one-quarter digit interval, is reflected back from this termination and arrives at the input of the delay line one-quarter digit later, at which time source 10 should present to this reflected pulse effectively an infinite impedance. The reflected pulse which is of the reverse polarity is therefore applied to the coupling capacitor 13 one-half digit after the appearance of the initial input pulse and thus in the time interval between successive input pulses. As each pulse of the input pulse train 15 is applied to the capacitor 13 and simultaneously to the delay line 17 it thus causes a reflected pulse so that a reflected pulse train 28 is, in effect, generated by the delay line and applied to the coupling capacitor 13. The sum of the input pulse train and this reflected pulse train 28 causes a total pulse train 30 to be applied to the coupling capacitor and to appear on the output of the coupling capacitor as the pulse train 31, seen in Fig. 2 having substantially equal positive and negative portions about the second element base voltage $E_1$.

This pulse train 31 is applied to the detector circuit comprising the resistances 23 and 26 and the unidirectional circuit element or diode 21 so that only positive portions appear as the output pulse train 32. Because of the restoration afforded by this invention, the pulses of the output pulse train 32 are all of equal amplitude and of an amplitude substantially equal to that of the pulses of the input pulse train 15. If the circuit element 11, to which the capacitor 13 is connected, is responsive only to pulses of one polarity, the diode 21 may be omitted. This would be true if element 11 were a diode logic circuit or an amplifier responsive only to positive pulse. In such a case only a load resistor need be connected to the output of the capacitor 13.

In order best to attain direct current restoration in a circuit in accordance with my invention, the power applied to the coupling capacitor 13 in the positive and negative portions of the total pulse train 30, that is, from the input pulses 15 and the reflected pulses 28, should be approximately equal. In accordance with one aspect of this invention this is attained by providing that the characteristic impedance of the delay line is approximately equal to or slightly less than the impedance seen by the input pulses at the coupling capacitor, which impedance comprises the parallel resistance of the resistance 23 and the series combination of resistance 26 and the forward resistance of diode 21, assuming voltage sources 19 and 25 to have negigible the impedance of pulse source 10 advantageously is essentially an open circuit during its inactive half-cycle. Because of the slight attenuation introduced by the delay line 17, its characteristic impedance should be slightly less than this parallel resistance so that the pulse applied to the delay line has slightly more power than the pulse applied directly to the capacitor 13. In this manner the reflected pulse of train 28 can be made to have the same power as the positive portion of the total pulse train 30.

It is to be understood that the above described arrangements are illustrative of the application of the principles of this invention only and that numerous other arrangements may be devised by those skilled in the art without departing from the spirit and scope of the invention.

What is claimed is:

1. A clamping circuit for assuring a desired direct current level of a train of pulses, comprising a source of pulses, a coupling capacitor, conducting means connecting said source and said capacitor, a delay line connected to said conducting means between said source and said condenser, said relay line being terminated substantially in a short circuit and the delay of said delay line being approximately one-quarter of the interval between successive pulses, and means connected to said condenser allowing passage therethrough only of pulses of a single polarity.

2. In an electrical circuit a source of pulses at a first direct current voltage level, a circuit element at a second direct current voltage level, a coupling capacitor connected between said source and said element, a delay line having its input connected between said source and said capacitor, said delay line being terminated substantially in a short circuit and the delay of said delay line being approximately one-quarter of the interval between successive pulses, and means connected between said capacitor and said element allowing passage therethrough only of pulses of the polarity of said pulses from said source.

3. In an electrical circuit in accordance with claim 2, the characteristic impedance of said delay line being not greater than and substantially equal to the impedance seen by pulses from said pulse source at said coupling capacitor.

4. In an electrical circuit, a source of pulses, said pulses occurring at one-digit intervals and being each of a one-half digit duration, a coupling capacitor connected to said source, a delay line having its input connected between said source and said capacitor, said delay line being terminated substantially in a short circuit and the delay of said delay line being approximately one-quarter digit, and means connected to said capacitor for passage therethrough only of pulses of the polarity of said pulses from said source.

5. In an electrical circuit in accordance with claim 4, said pulse source and said means being maintained at different direct current voltage levels.

6. In an electrical circuit in accordance with claim 4, the characteristic impedance of said delay line being substantially equal to and not greater than the impedance seen by said pulses from said source at said coupling capacitor.

7. In an electrical circuit a source of pulses maintained at a first direct current voltage level, said pulses occurring at one-digit intervals and being each of a one-half digit duration, a circuit element maintained at a second direct current voltage level, a coupling capacitor connected between said source and said element, a delay line having its input connected between said source and said capacitor, said delay line being terminated substantially in a short circuit and the delay of said delay line being approximately one-quarter digit, and diode means connected between said capacitor and said element.

8. In an electrical circuit in accordance with claim 7, the characteristic impedance of said delay line being substantially equal to and not greater than the impedance seen by said pulses from said source at said coupling capacitor.

References Cited in the file of this patent

UNITED STATES PATENTS

| | | |
|---|---|---|
| 2,401,416 | Eaton et al. | June 4, 1946 |
| 2,416,895 | Bartelink | Mar. 4, 1946 |